(12) United States Patent
Nagarkar et al.

(10) Patent No.: US 10,859,718 B1
(45) Date of Patent: Dec. 8, 2020

(54) LAYERED CONVERTER FOR HIGH-RESOLUTION NEUTRON RADIOGRAPHY

(71) Applicant: Radiation Monitoring Devices, Inc., Watertown, MA (US)

(72) Inventors: Vivek V. Nagarkar, Watertown, MA (US); Matthew Marshall, Brookline, MA (US); Harish Bhandari, Brookline, MA (US); Stuart Miller, Brighton, MA (US)

(73) Assignee: Radiation Monitoring Devices, Inc., Watertown, MA (US)

( * ) Notice: Subject to any disclaimer, the term of this patent is extended or adjusted under 35 U.S.C. 154(b) by 103 days.

(21) Appl. No.: 16/165,315

(22) Filed: Oct. 19, 2018

Related U.S. Application Data

(60) Provisional application No. 62/576,247, filed on Oct. 24, 2017.

(51) Int. Cl.
 *G01T 3/06* (2006.01)
 *G01T 3/00* (2006.01)
 *H01J 47/12* (2006.01)
 *G01T 1/29* (2006.01)
 *G01N 23/09* (2018.01)
 *G01T 1/202* (2006.01)

(52) U.S. Cl.
 CPC .............. *G01T 3/06* (2013.01); *G01N 23/09* (2013.01); *G01T 1/202* (2013.01); *G01T 1/29* (2013.01); *G01T 3/006* (2013.01); *H01J 47/12* (2013.01)

(58) Field of Classification Search
 None
 See application file for complete search history.

(56) References Cited

U.S. PATENT DOCUMENTS

| 7,105,832 | B2 | 9/2006 | Dai et al. |
| 7,372,041 | B1 | 5/2008 | Nagarkar et al. |
| 2006/0054863 | A1 | 3/2006 | Dai et al. |
| 2008/0061243 | A1* | 3/2008 | Doshi .................. G01T 1/2018 250/368 |
| 2009/0050810 | A1* | 2/2009 | Nagarkar ............... G01T 1/202 250/361 R |
| 2013/0193329 | A1 | 8/2013 | Srivastava et al. |
| 2017/0329028 | A1* | 11/2017 | Kunimoto ................ A61N 5/10 |
| 2018/0172852 | A1* | 6/2018 | Newman ................... G01T 3/06 |

OTHER PUBLICATIONS

V.V. Nagarkar et al., "New Structured Scintillators for Neutron Radiography, 10th World Conference on Neutron Radiography" Oct. 5-10, 2014.
ORNL/TM, "Neutron Activation foil and thermal luminescent dosimeter responses to a polyethylene reflected pulse" 2016/317.

* cited by examiner

*Primary Examiner* — Hoon K Song
(74) *Attorney, Agent, or Firm* — Culhane Meadows PLLC; Orlando Lopez

(57) ABSTRACT

Large detection area, high spatial resolution, high dynamic range and low noise neutron detectors are disclosed. Curved detectors that minimize parallax errors and boundary regions without sacrificing its intrinsic resolution or the efficiency are also disclosed.

31 Claims, 14 Drawing Sheets

(a)                        (b)

LAYERED CONVERTER FOR HIGH-RESOLUTION NEUTRON RADIOGRAPHY

CROSS-REFERENCE TO RELATED APPLICATIONS

This application claims priority to U.S. Provisional Patent Application No. 62/257,247, filed on Oct. 24, 2017, entitled LAYERED CONVERTER LAYER FOR HIGH-RESOLUTION NEUTRON RADIOGRAPHY, which its incorporated by reference herein in their entirety for all purposes.

BACKGROUND

These teachings relate to radiation detectors for the detection and imaging of neutrons. In particular to detectors consisting of a scintillator layer that is sensitive to incident radiation and emits light photons that are detected by a light-sensitive device.

The properties and function of many substances are strongly tied to their molecular shape. This is particularly true of biological and pharmaceutical materials, which often function through close range "lock and key" interactions with a precisely shaped receptor. Knowing the detailed structure of these materials can be a key step toward understanding their behavior. Hydrogen atoms often play a crucial role in the lock and key configuration—they form the outer shape of most bioactive molecules, dictating key points of contact and the position of reactive groups when the molecule is complexed with a receptor. Thus, pinpointing the positions of hydrogen atoms within these compounds is an important step toward understanding their function.

The degree to which neutrons scatter from different atoms varies randomly with atomic number, allowing light atoms like hydrogen to be seen easily in the presence of heavier ones. Neutron-based techniques are therefore ideal for building on existing high quality data from x-ray diffraction—better suited to identifying heavier atoms to refine the detail of molecular structures by precisely locating the hydrogen atoms. The superior ability of neutrons to precisely locate hydrogen (or deuterium) atoms in macromolecular structures is important to unveiling protein function. Neutron crystallographic techniques are used to refine our understanding of the structures and activity of small organic molecules to an exceptional degree.

Neutron crystallography is currently the only means that allow scientists to "see" the critical hydrogen atoms of the active site. Furthermore, it allows understanding of mechanisms of enzyme activity (e.g., how a substrate is changed by the enzymatic process or how a drug blocks the function of the enzyme). By studying a deuterated substrate bound to an enzyme, it will be possible to determine the location of the enzyme's active site and the probability that a potential drug will bind to that site and block the enzyme's undesired activity. To design a new drug to block the action of a protein causing a disorder, it is essential to know the structure of that protein. An example of this application is in the development of Ibuprofen, an anti-inflammatory drug commonly prescribed to relieve muscular and skeletal pain. The crystallographic studies on this compound gave the positions and thermal motions of all the atoms in the ibuprofen molecule, including 18 hydrogens, with the unprecedented detail only available from neutron diffraction. Also, neutrons complement X rays in studying proteins in solution to glean information that could be of vital interest to the pharmaceutical, agricultural, and biotechnology industries Single crystal techniques have also been used to investigate acetylcholine (ACh), a neurotransmitter found particularly in the brain and at the junctions of nerve and muscle. It is the binding of the molecule into these receptors that triggers a series of events leading to muscle contraction. A valuable addition to this research is the structural investigation including refining the positions of all the atoms with great accuracy is being carried out using neutron crystallography. High Resolution Powder Diffraction has recently been used to investigate the structure of another neurotransmitter, dopamine, which is found in the brain. Refining the structure of dopamine posed several challenges, not least of which was the large hydrogen background signal obtained from a molecule of this size and complexity. By replacing all the hydrogen atoms in the molecule with the heavier isotope, deuterium, its crystal structure was successfully determined.

If the protein-folding problem could be solved, then gene sequences could be translated directly into three-dimensional structures. However, an extraordinary amount of neutron and x-ray data must be generated to aid the long-term development and validation of computer algorithms to predict protein folding. Meanwhile, the structure of almost every interesting protein will require a separate analysis, extending the time required to determine form and function in all macromolecules of biological interest. Development of a new generation of area detectors with high spatial resolution and rapid response is of vital importance.

A conventional method of data acquisition in X-ray protein crystallography is the rotation method. A series of detector images is accumulated corresponding to steps of the crystal around a common rotation axis. The crystal is illuminated by a monochromatic beam of X-rays and the detector position is not moved between steps of the crystal. The steps are typically 0.1° to 0.25° in size, a small enough increment so that reciprocal lattice points are found on a few adjacent images. At each step the crystal is rotated or oscillated over the step interval. This so-called fine-slicing method (or 4)-slicing method since the rotation axis is usually 4)) yields a three-dimensional raw data set, where two dimensions map to the pixels of the flat area detector and the third dimension is the rotation angle of the crystal. Each detector image corresponds to a thick curved slice of reciprocal space and the three-dimensional data set corresponds to a large volume in reciprocal space made from a stack of those slices.

An alternative to fine-slicing which can be used at synchrotron X-ray sources is the Laue method. Detector images are collected from a stationary crystal illuminated by a polychromatic X-ray beam. An advantage of this method over fine-slicing is that a large amount of data can be collected rapidly. However, because diffraction data from all wavelengths are collected simultaneously, a large volume of reciprocal space is essentially collapsed into two-dimensions, leading to a reduction in the signal-to-noise ratio of integrated reflections and an increase in the spatial overlap and the energy overlap of spots on the detector. Similar disadvantages exist with monochromatic X-ray data acquisition methods that use wide rotation or oscillation angles.

The conventional method of data acquisition in neutron protein crystallography at reactor sources is fine-slicing. However, it is usually not necessary to oscillate the crystal over the step interval because of the large monochromator dl/l used in order to increase the flux of the incident neutron beam. A disadvantage of this method is the small size of available electronic 2D neutron detectors. In addition to moving the crystal over a series of steps around a rotation axis, the detector also has to be moved in order to collect all the diffracted data at each crystal position. A disadvantage of monochromatic methods in general is that only a small fraction of the available neutron flux is used.

Recently, neutron sensitive image plates have been developed that can cover large solid angles. Neutron sensitive image plates have unfavorable readout times compared to electronic detectors, however, this disadvantage is largely offset by the fact that there is no need to reposition the detector and neutron sensitive image plates are successfully used to collect protein crystallographic data with fine-slicing. Neutron sensitive image plates have also been used in combination with polychromatic neutron beams in order to collect Laue neutron data. Laue techniques were first applied in protein crystallography with neutrons. The advantage of using Laue methods is that more of the available neutron flux is used. Some of the disadvantages of the Laue method, in particular the build-up of incoherent background scattering, are reduced by using the so-called quasi-Laue method in which the wavelength range of the incident neutron beam is restricted to a narrow band.

Wavelength-resolved Laue methods have been used to collect neutron crystallographic data from small molecules at spallation neutron sources for many years. The first application of this technique to neutron protein crystallography is the PCS at Los Alamos Neutron Science Center (LANSCE). The PCS is the first to be built at a spallation neutron source. The PCS differs from existing spallation neutron crystallography stations because the neutron beam wavelength distribution, flux and divergence as well as the detector geometry have been tailored for protein crystallography.

At the spallation neutron source run by LANSCE neutrons are produced in μs pulses at a rate of 20 Hz. Neutrons in the pulses are essentially time-stamped and travel as a function of their energy so that neutrons of different wavelengths are detected at different times. By recording the time-of-flight information of a detected neutron, its wavelength can be calculated. The wavelength-resolved Laue method yields a three-dimensional data set, where two dimensions map to the pixels of the area detector and the third dimension is time-of-flight (wavelength). In practice the neutrons are binned into time channels about 500 μs thick, with each time channel corresponding to a thick curved slice in reciprocal space of thickness λ*0.07 Å. A detector image is equivalent to a large volume in reciprocal space made from a stack of these slices. The wavelength-resolved Laue technique has all the advantages of the conventional Laue method, but does not suffer to the same extent from reflection overlap, because the spots are resolved in wavelength, and background accumulation, because the incoherent background is spread across the full wavelength band.

The PCS data acquisition system consists of a gas position sensitive detector, detector electronics, time-of-flight data acquisition electronics, goniometer with motors and an instrument control personal computer and is described in detail by Langan, P. Greene, G. & Schoenborn, B. P., *J. App. Cryst.* (In press). The goniometer consists of a co-stage with a vertical rotation axis and a custom designed 20d arm for the detector, also with a vertical rotation axis. On top of the co-stage is mounted a (K, 4)) 2-circle goniometer constructed in 50° K geometry. The position sensitive detector has a height of 20 cm that subtends 16° at the sample position, and a curved horizontal dimension with a radius of 70 cm that subtends 120° at the sample position. The detector can be rotated in 20d and it can be translated in the vertical direction. The sample to detector distance is fixed. The vertical translation is only used during detector calibration measurements. The spatial resolution of the detector is <1.5 mm and the time resolution is ~1 jts. The detection efficiency is 50% at 1 Å and >90% at 5 Å. The variation in efficiency with wavelength means that neutrons of different wavelengths will, on average, be detected at different gas depths. A wavelength dependent parallax correction is therefore required during data analysis, as described below.

The goniometer moves the crystal through a number of orientations recording a wavelength-resolved Laue pattern on the detector at each setting. The wavelength range is about 0.6 Å to 6 Å. Typically, the aim of an experiment on the PCS is to obtain the intensities of all of the Bragg reflections as efficiently as possible. Data is typically collected by rotating the crystal around p in steps of 15-30° to cover the appropriate p range for the space group (90° for orthorhombic, 180° for monoclinic). The goniometer angles K and co are then changed in order to reorient the crystal to collect further p scans in order to cover the remaining regions of reciprocal space that are blind largely due to the limited height of the detector. A PCS with greater detector coverage could be far more efficient.

The PCS is located on a coupled thermal water moderator, which produces a spectrum of neutrons that peaks at about 1 Å. Most of the useful diffracted neutrons can be collected within a scattering angle (20) of about 60°. However, the next generation of protein crystallography stations that are being designed for future neutron spallation sources will be located at cold hydrogen moderators where the spectrum of neutrons peaks at about 3 Å. Scattering angles out to 180° will need to be covered by detectors. This can only be done at reasonable costs by reducing the sample to detector distance from that on the PCS (~70 cm) towards 30-50 cm, making high spatial resolution very important.

Current Position Sensitive Thermal Neutron Detectors

At present only a handful companies commercially sell neutron detectors. Noteworthy among these are Ordela, MAR, ADSC, Fuji, and Quantum Detectors from the United States and Circa, France. Most of the imaging neutron detectors marketed by these companies include photographic films, imaging plates and multiwire chambers. Recently developed CCD based detectors are available mostly for x-ray crystallographic studies. These detectors are not only expensive, but also pose several performance limitations in terms of resolution, speed of operation, or limited S/N ratios and dynamic range. Furthermore, the lead-time for delivery of some of the new detectors is notoriously long. The choice of detector technology for a particular application is determined by the required efficiency, counting rate capability, size, dynamic range, sensitivity to background, and stability as a function of time.

The photographic film-based systems allow very high spatial resolution, ~50 μm with gadolinium foil converters, and are inexpensive. However, film suffers from poor sensitivity, low dynamic range, a nonlinear response, and no real-time output. In addition, it is very difficult to obtain quantitative results. At low neutron fluxes scintillator/film combinations suffer from reciprocity failure and systems using gadolinium converter foils exhibit quantum mottling effects. At high neutron fluences, grain saturation is observed in photographic methods, limiting their ability to quantify intense diffraction peaks. Gas counters are reliable and well understood. They have a large dynamic range, produce real-time data outputs and excellent gamma ray discrimination properties. However, they suffer from relatively poor spatial resolution (a few mm), complexity, and high cost. The limited position resolution is due to the range of the secondary charged particles used to trigger the ionization cascade. The most serious shortcoming of these detectors is their slow response, which limits the counting rates to $3 \times 10^5$ counts per second or less. Currently, the technology of choice has been $^3$He gas proportional detector. While they offer superior efficiency compared to the other existing detectors (50% @ 1 Å), the efficiency is lower than the desired value of 85% or better and have a limited count rate capabilities.

the scintillator. Each crystal is coupled to a PMT using optical fibers. Such detectors have wide dynamic range, good quantitative response, and high sensitivity. However, detectors utilizing this approach are presently limited to a position resolution of ~1 mm. Additionally, PMT based detectors are expensive, and cannot be operated in magnetic fields.

In the new designs, the PMT is replaced by a CCD, which eliminates the spatial resolution limitations of the PMT sensors. While the system spatial resolution is significantly

TABLE 1

Properties of the currently known position sensitive neutron detector

| Detector System | Primary reaction | Exposure Time | Detector Area (cm$^2$) | Pixel Size (mm) | Dynamic Range | Special Conditions | Status of the Development |
|---|---|---|---|---|---|---|---|
| Film + Converter | Capture in Gd | ~5 min | 432 | 0.02 | 100 | Chemical development | Standard |
| Track-etch foil | Capture in B$^{10}$ | 15 min | 108 | 0.02 | 100 | Etching in sodium lye | Standard |
| CCD camera + Scintillator | Capture in Li$^6$ | ~10 s | 625 | 0.5 | 65536 | Outside the direct beam | Under improvement |
| 1CCD + scintillator | Capture in Li$^6$ | few ms | 625 | 0.5 | 1000 | Outside the direct beam | Under improvement |
| n-sensitive imaging plates | Capture in Gd | ~10 s | 800 | 0.05 | 65536 | Special scanner | Under improvement |
| Amorphous Si array + scintillator | Capture in Li$^6$ | 40 ms | 100 | 0.7 | 16384 | In the direct beam | Under development |
| Video CCD + scintillator | Capture in Li$^6$ | 40 ms | 1 | 0.002 | 4096 | In the direct beam | Under development |

Imaging plates are commonly used in x-ray and neutron crystallography and offer high dynamic range, linearity of response, and high resolution. The main disadvantages of imaging plate detectors are their relatively lower detection efficiency for neutrons, undesirable gamma sensitivity and longer readout time.

Flat panel detectors are manufactured as multipixel circuits on silicon or selenium substrates. The manufacturing process has been very difficult, very costly, has required highly technical talent to perform, and generally results in plates, which are full of errors. During manufacture, even in the specially designed, multi-level clean room manufacturing environment, dust on the large area plates is difficult to control. Most errors manifest themselves as non-functioning individual pixels. A large area detector may contain 3 million pixels or more. As much as 0.1% of these pixels may be faulty. When the image is stored in a computer, software is used to correct the output at bad pixel positions, usually by substituting for the bad intensity an average value of nearby pixels. Many users are unhappy with such software solutions since, in their search for minute details, the corrected pixel could be masking a true feature.

Recent thinking on this matter suggests that it should be easier to find success in concentrating on improving small area detectors such as CCD detectors (1 square inch or so in area), which today are far less.

There are two types of scintillator based position sensitive thermal neutron detectors. One approach uses Anger logic realized with an array of photomultiplier tubes (PMTs) attached to a large, continuous area scintillator. A neutron interaction generates light incident on many PMTs. The spatial resolution of Anger cameras is limited by the electronics to a few millimeters. In the second approach, the discrete scintillator, an array of crystals is fabricated from improved with CCDs, these systems offer a tradeoff between the scintillator thickness (detection efficiency) and the spatial resolution.

Table 1 summarizes the properties of the currently known neutron position sensitive detectors. As at seen from the table, there are no current detectors that combine large detection area, high spatial resolution, high dynamic range and low noise, required by the crystallographic applications.

New high-intensity neutron sources, such as the Spallation Neutron Sources (SNS) at ORNL, are vital tools for future discoveries in diverse areas of fundamental sciences including materials science, condensed matter physics, and biological sciences. The ultrahigh neutron intensities of the SNS allow for unique capabilities such as in-plane diffraction and off-specular/grazing-incidence small-angle scattering measurements. This permits a combination of reflectometry and high-angle diffraction that may resolve both large-scale and nanoscopic structural/magnetic features under the same experimental conditions.

The detectors used at single crystal instruments require: high spatial resolution, large active area, high thermal neutron efficiency, and effective neutron-gamma discrimination. Large area detectors face significant challenges in maintaining spatial resolution in the face of parallax errors when neutrons are captured at oblique angles using conventional flat scintillators. This problem is exacerbated when thick scintillators are used to enhance the neutron absorption efficiency, leading to degradation in angular resolution. This causes inaccuracies in measured features like nanoscopic structural parameters. In conjunction with parallax errors, flat detectors have significant dead areas between readout sensors. These configurations result in loss of angular coverage as well as large boundary areas where both resolution and accuracy suffer.

There is a need for large detection area, high spatial resolution, high dynamic range and low noise neutron detectors.

There is a need for curved detectors that minimize parallax errors and boundary regions without sacrificing its intrinsic resolution or the efficiency.

BRIEF SUMMARY

Large detection area, high spatial resolution, high dynamic range and low noise neutron detectors are disclosed herein below.

Curved detectors that minimize parallax errors and boundary regions without sacrificing its intrinsic resolution or the efficiency are also disclosed herein below.

In one or more embodiments, the neutron detection device of these teachings includes a neutron sensitive layer that absorbs the neutrons and converts the energy from the neutron into another form of energy such as electrons, betas or gammas, a scintillator layer located in close proximity to the neutron sensitive layer, the scintillator layer configured to absorb energy emitted from the neutron sensitive layer to convert the energy into optical photons, close proximity being obtained by one of vacuum depositing the scintillator layer on the neutron sensitive layer or vacuum depositing the neutron sensitive layer on the scintillator layer, and a light sensitive device configured to detect the optical photons from the scintillator and to form an image.

In one or more other embodiments, the neutron detection device of these teachings includes a layer of neutron sensitive material in powder form; wherein the layer absorbs the neutrons and converts the energy from the neutron into another form of energy such as electrons, betas or gammas, a scintillator layer located in close proximity to the layer of neutron sensitive material, the scintillator layer configured to absorb energy emitted from the layer of neutron sensitive material to convert the energy into optical photons. the scintillator layer extending from a first side surface to a second side surface; the layer of neutron sensitive material being deposited on the first side surface, and a light sensitive device configured to detect the optical photons from the scintillator and to form an image.

In one or more embodiments, the method of these teachings for fabricating a neutron detection device includes placing a first end surface of a scintillator layer in close proximity to a neutron sensitive layer; wherein the neutron sensitive layer absorbs the neutrons and converts the energy from the neutron into another form of energy such as electrons, betas or gammas and the scintillator layer absorb energy emitted from the layer of neutron sensitive material to convert the energy into optical photons, and operatively optically connecting a light sensitive device to a second end surface of the scintillator layer in order to detect the optical photons from the scintillator.

In one instance, the neutron sensitive layer is one of foil of neutron sensitive material or a layer of neutron sensitive material in powder form.

In one embodiment, a tapered optical fiber is disposed between the scintillator layer and the light-sensitive device. In one instance, the tapered optical fiber has an input surface and an output surface, the scintillator layer is disposed on the input surface, and the input surface is curved and has a concave shape.

A number of other embodiments are also disclosed.

These teachings relate to fabrication of high-resolution structured sensor for imaging with neutrons.

The sensor includes multilayered format where one of the layers consists of neutron sensitive elements such as Li, B, Gd, Cl, He, H etc. and the other layer is a scintillator. These layers can be stacked alternately The neutron-sensitive layers interact with neutrons to produce energetic reaction by-products, which is turn interact with the scintillator to produce visible photons. These photons are channeled through the microcolumnar structure that permit high spatial resolution imaging.

In one instance, some of these layers are fabricated by vacuum deposition of materials. The art of evaporating neutron sensitive material on scintillator allows to grow them in a cubic columnar format, as long as one of them is cubic in its crystalline nature. Growing these multilayered structure in a columnar format allows high-resolution neutron imaging with high sensitivity for neutrons.

For a better understanding of the present teachings, together with other and further needs thereof, reference is made to the accompanying drawings and detailed description.

DETAILED DESCRIPTION

Figure 1:
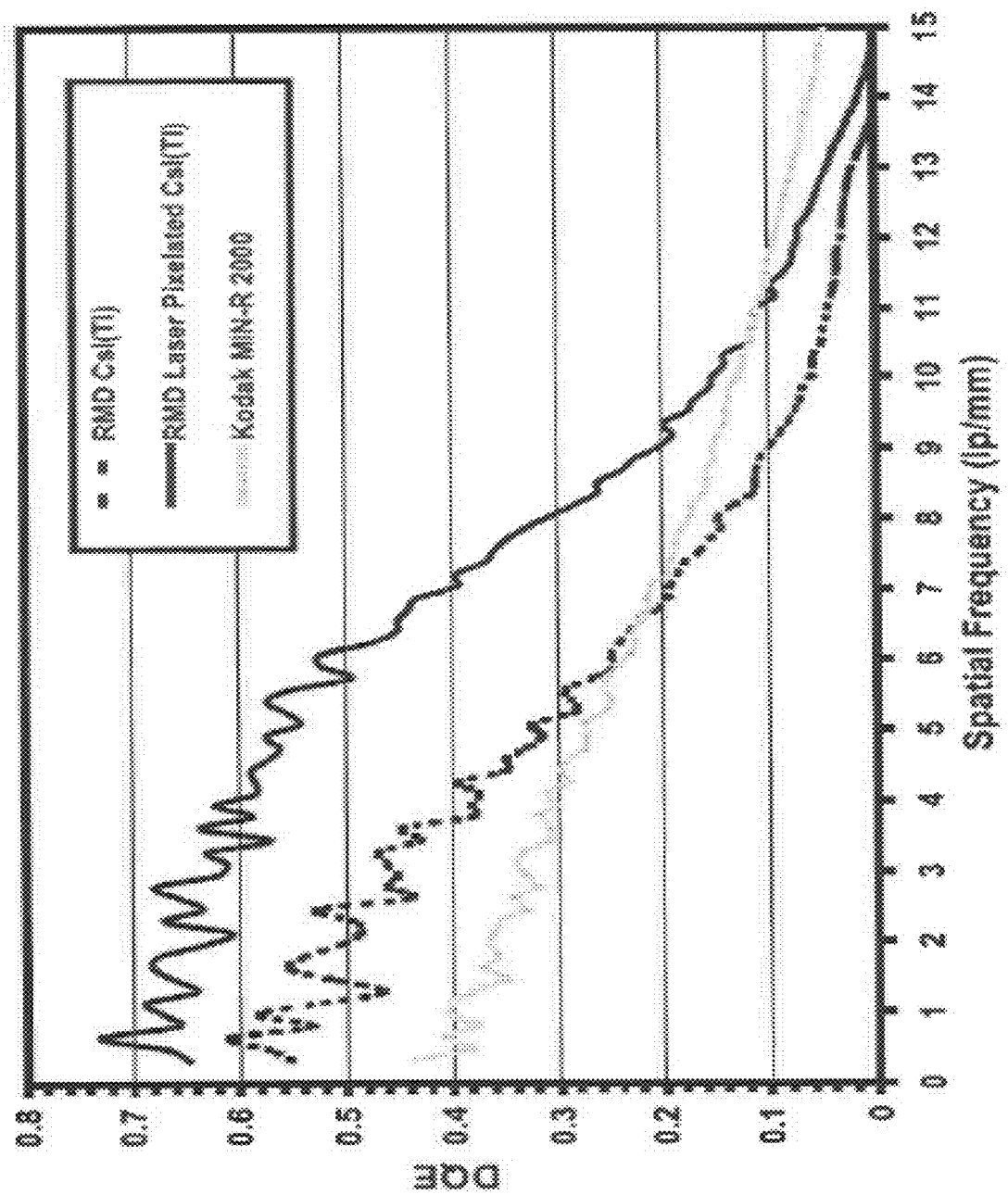
FIG. 1 shows effect of pixelation on the detective quantum efficiency (DQE) of a digital imaging system.

The following detailed description presents the currently contemplated modes of carrying out the invention. The description is not to be taken in a limiting sense, but is made merely for the purpose of illustrating the general principles of the invention, since the scope of the invention is best defined by the appended claims.

"Vacuum deposition," as used here in, includes film deposition techniques such as chemical vapor deposition, physical vapor deposition (PVD), atomic layer deposition, thermal evaporation, and electron beam evaporation.

A "tapered optical fiber," as used here in, is an optical fiber which are over some length stretched out to a smaller diameter.

A "neutron sensitive layer," as used here in, is a layer of a material that absorbs the neutrons and converts the energy from the neutron into another form of energy such as electrons, betas or gammas.

A "neutron sensitive material," as used here in, is a material that absorbs the neutrons and converts the energy from the neutron into another form of energy such as electrons, betas or gammas.

For the next generation of neutron protein crystallography station, large area neutron detectors, with high spatial resolution, high counting rates, high detection efficiencies (50-90%) and low background noise will be essential. The high-resolution requirement is related to the ever-improving beam size. It is anticipated that beam sizes will soon go to sub millimeter due to the K-B mirror development [43] and will make it necessary to resolve details down to 500 jtm or smaller. For pulsed neutron sources additional time of flight information, typically with a resolution of 1 jts is needed for energy estimation. To discriminate against the large high-energy y background typically present in the neutron source environment excellent gamma rejection capability is needed. The specific detector requirements are:

1. Excellent gamma ray rejection or insensitivity;
2. Spatial resolution of 500 μm or better
3. Detection efficiency >50% for thermal neutrons;
4. Large sensitive area of 100 mm×100 mm or larger
5. Time resolution of 1 μs or better;
6. Count rates in excess of $10^7$ n cm's$^{-1}$; and finally,
7. Low cost, so that banks of detector panels can be used for diffraction instruments.

Satisfying these requirements will require the development of new detector systems. The system of these teachings system satisfies most of the aforementioned requirements.

Large detection area, high spatial resolution, high dynamic range and low noise neutron detectors are disclosed herein below.

In one or more embodiments, the neutron detection device of these teachings includes a neutron sensitive layer that absorbs the neutrons and converts the energy from the neutron into another form of energy such as electrons, betas or gammas, a scintillator layer located in close proximity to the neutron sensitive layer, the scintillator layer configured to absorb energy emitted from the neutron sensitive layer to convert the energy into optical photons, close proximity being obtained by one of vacuum depositing the scintillator layer on the neutron sensitive layer or depositing the neutron sensitive layer on the scintillator layer, and a light sensitive device configured to detect the optical photons from the scintillator and to form an image. Deposition of the neutron sensitive layer can be by a vacuum deposition techniques such as chemical vapor deposition, physical vapor deposition (PVD), atomic layer deposition, thermal evaporation, and electron beam evaporation, or other deposition techniques, such as spray coating, screen printing or chemical bath or powder deposition techniques.

In some embodiments, the neutron sensitive layer comprises one of lithium, boron, gadolinium, cadmium, indium, dysprosium or compounds thereof. In other embodiments, scintillator layer is a microcolumnar scintillator layer. In some instances, the scintillator layer is composed of CsI:Tl, CsI:Na, LaBr$_3$:Ce, CeBr$_3$, or Tl or Eu doped Lithium Sodium Iodide (LixNa1$_{-x}$I:Tl,Eu). In some embodiments, the scintillator layer is a pixelated scintillator layer. It should be noted that embodiments in which the scintillator layer is not pixelated are also within the scope of these teachings.

The scintillator layer extends from a first side surface to a second side surface; wherein the first side surface is located in close proximity to said neutron sensitive layer. In some embodiments, a second neutron sensitive layer is disposed between the scintillator layer and the light-sensitive device and is in close proximity to the second side surface of the scintillator layer. In some instances, the second neutron sensitive layer comprises at least one of GdF3, Gd2O3 or LiF.

Exemplary embodiments are presented herein below. In order to further elucidate these teachings. It should be noted that these teachings are not limited to only the exemplary embodiments.

First Exemplary Embodiment

Technical requirements for detectors needed to detect neutrons are position-sensitivity, excellent resolution (100 μm or better without geometric magnification), high efficiency (>80% for 0.2 to 2.5 Å neutrons), fast timing (hundreds of nanoseconds), and excellent response linearity over large areas. The key to producing a detector with these capabilities is to select an appropriate scintillator material, the component in the detector that converts incident radiation to light, and to form it for optimal optical performance. These teachings disclose such a scintillator, which uses an internal microstructure similar to fiber optics to channel light very precisely to a detector (such as a charge-coupled device (CCD)), thereby preserving resolution. The applicants have mastered the production of such microcolumnar scintillators, particularly using doped CsI. Since many scintillators, such as CsI(Tl), are relatively insensitive to neutrons, a neutron sensitive compound, such as Gd2O3, is deposited on the microcolumnar scintillator, for example CsI(Tl), surface.

An exemplary embodiment using Gd2O3 and a CsI(Tl) scintillator is disclosed herein below. It should be noted that these teachings are not limited only to that exemplary embodiment. Gd absorbs neutrons and thereby generates electrons and other products that cause scintillation in CsI (Tl), and the scintillation light is channeled via CsI(Tl) microcolumns to the optical detector. To increase the efficiency at which incident neutrons are detected, CsI(Tl) is pixelated to create 3-dimensional pixels and cover the pixels with the Gd2O3. This increases the converter-covered surface area 5-fold. Transparent Gd2O3 is also deposited on the bottom of the CsI(Tl) layer to form a "sandwich" of CsI(Tl) between Gd2O3. The resulting large Gd2O3 surface area increases the neutron detection efficiency from the current state of the art for scintillators of 20%-40%, to an estimated 80% efficiency, while Gd2O3 is sufficiently transparent for CsI(Tl) scintillation light to pass through to the photodetector. This is extremely important, in that it leads to a two- to four-fold increase in detector sensitivity, and thus allows detection of objects that might otherwise have been missed, allows this detection to happen more quickly, and allows images to be created in half the time otherwise required. It has been successfully demonstrated, by the present teachings, the feasibility of neutron detection with CsI(Tl) augmented by a suitable converter material. It has been shown, by the present teachings that a triple structure (Gd2O3/CsI (Tl)/Gd2O3 can be deposited on an aluminum substrate and can be used for neutron detection with high efficiency (~80%) and spatial resolution of 100 microns or better.

These teachings result in optimization of a fiber optic-like scintillator film that channels light coherently and accurately to the optical detector, and that is sensitive to neutrons but not to gamma radiation. (Gamma radiation is a common source of background "noise" in neutron detectors, so gamma sensitivity is often problematic to neutron detection instrument users.) Currently available neutron sensors are often highly sensitive to g-rays and therefore cannot be used for many important studies. The scintillator film of these teachings can be deposited on substrates as small as 1 cm$^2$ and with no upper limit other than the size of the evaporator for production of films. Thus, with suitably-sized deposition chambers, scintillators can be made large enough for scanning packages in the postal system, luggage at the airport, and crates in cargo containers.

These teachings result in a unique high-resolution high efficiency neutron detector. Furthermore, existing systems use lens-based coupling of the scintillator screen to the CCD. Lens based systems result in >97% loss of signal, low S/N ratios, higher detection threshold, and narrow dynamic range. A CCD detector with a fiberoptic taper overcomes this difficulty as the fiberoptic minimizes the signal loss (~40% loss compared to 97% or more for the lens coupling). Recently, amorphous silicon technology has progressed to the point where large area (28×43 cm$^2$) relatively low noise (<1000 e$^-$ total noise) a-Si:H arrays are now available. This advancement in the noise performance has alleviated the previous low efficiency (20%) of the a-Si:H detectors using gadolinium foil converters ($^{156}$Gd and $^{158}$Gd). The scintillator of these teachings complements this advancement allowing fabrication of a large area high-resolution digital imaging sensor.

The use of gadolinium and boron converter foils for image plates, silicon detectors and low-pressure gas detectors have been investigated by several researchers [51, 52, 53]. The common problem for these detectors is low efficiency due to low probability of conversion electrons escaping the Gd layer. These teachings address this problem by making the Gd-containing converter layer very thin allowing an easy escape of the conversion electrons into the scintillator. This is possible since the converter layer will be deposited on both sides of the scintillator, increasing the probability of neutron detection. Therefore the overall efficiency of the sensor will be increased even with the thinner converter. The scintillator will be made fairly thin as well, since it will be registering low energy electrons. Thin scintillators have a great advantage of high spatial resolution, which is desperately needed in biological applications of neutron diffraction.

Additionally, a thin scintillator will be insensitive to high energy gammas, which is another crucial quality for a neutron imaging detector.

Digital, solid-state technologies provide the most promise in achieving an efficient combination of the required properties.

Conceptual Design of the Neutron Sensor a. Limitations of Current Neutron Imaging Scintillators Even though the concept of using a CCD-coupled scintillator for neutron imaging has been established, there are not many scintillators suitable for this task on the market and there is a need for the further research in this area [55]. The most widely used scintillator types in neutron radiography/diffraction studies are $^6$LiF/ZnS(Ag) and Gd2O3S (GOS). Making the scintillator thicker, for higher efficiency is not always practical, because these scintillators are used as powder screens and are opaque to their own light, which limits their useful thickness. Thicker scintillators are also prohibitive because of their enhanced gamma sensitivity and lower spatial resolution. A $^6$LiF/ZnS(Ag) scintillator has high light output, but lower neutron detection efficiency than GOS and a long light decay time (80 μs), precluding its use for high count rate applications Moreover, its peak emission at 460 nm is not as well matched with CCD sensitivity. The reported spatial resolution for these scintillators, combined with CCDs is at best 1 mm. The compromise between thickness and spatial resolution makes powder screens less attractive for use in digital imaging. The summary of the existing scintillators and their properties is presented in Table 2.

b. Design of the Neutron Sensor i) The Scintillator

The choice of using a pixelated, microstructured CsI(Tl) with Gd2O3 serving as a neutron converter has several distinct advantages. Microcolumnar CsI(Tl) has a very high scintillation efficiency (60,000 photons/MeV), which will produce a good signal from low energy conversion electrons. The low noise and high light output of CsI(Tl) will translate into the high dynamic range necessary for quantifying Bragg peaks of various intensities. The spatial resolution of this scintillator is determined by its internal microcolumnar structure, which limits the lateral spread of scintillation light and channels the light down to the CCD via columns of 3-5 μm in diameter. Furthermore, pixelation of the scintillator provides two important advantages. First, it increases the total surface area of the scintillator, almost five-fold (each pixel has five open surfaces), which effectively enhances the total $_{Gd_2o_3}$ converter area thereby allowing efficient detection of the incident flux. Second, it limits the lateral spread of scintillation light, improving image contrast and hence the observed image quality. Our experience with using pixelated CsI(Tl) scintillator screens in x-ray imaging has shown that pixelated screens can improve the detective quantum efficiency (DQE) of a system by a significant amount as compared to non-pixelated screens. FIG. 1 shows the measured DQE of a CCD system coupled to three different screens, namely GOS (Kodak min-R 2000, RMD's microcolumnar CsI(Tl) and RMD's pixelated, microcolumnar CsI(Tl). The system DQE is seen to be substantially higher with the pixelated screen.

TABLE 2

Comparison of the current scintillators for neutron images to the scintillator of these teachings.

| Scintillator | λ (nm) | Density (g/cm³) | γ-sensitivity | Abs. Length at 1 Å (mm) | Light yield (photons/n) | Light yield (photons/MeV γ) | τ (ns) | n detection efficiency | Spatial Resolution |
|---|---|---|---|---|---|---|---|---|---|
| ⁶Li(Ce)-glass | 395 | 2.5 | | 0.52 | 6000 | 4000 | 785 | 65% | 3 mm |
| ⁶LiI(Eu) | 470 | 4.1 | Moderate | 0.54 | 5000 | 10000 | 1400 | | 1 mm |
| ⁶LiF/ZnS(Ag) | 450 | 2.6 | Moderate | 0.8 | 160000 | 75000 | 80000 | 40% | 5 mm |
| Gd₂O₃S | 510 | 7.3 | High | 0.25 | 50000 | 59000 | 3000 | 20 & | 1 mm |
| present | 540 | 4.1 | Low | 0.5 | To be measured | 60000 | 680 | 80% | <100 μm |

Although CsI(Tl) is sensitive to gamma radiation, the sensor has a CsI(Tl) layer of less than 25-30 μm. The sensitivity of this thin layer to high-energy gammas will be negligibly low. For example less than 1% of 182 keV thermal neutron capture gammas in $^{157}$Gd will be attenuated in 25 μm layer of CsI. Data has been acquired with 25-30 μm-thick sensors, which have shown negligible sensitivity to the gamma component.

An important property of a detector is its dead time and count rate capabilities. The measured decay time of the CsI(Tl) is 680 ns, which allows it to handle count rates in excess of 10⁶ counts per second (CPS). The readout detector used herein is a high resolution CCD, which is an integrating device. The dead time in this case is the readout time of the CCD, which varies between 1 ms to over 1 s depending on the chip size and the readout electronics). However the readout choice is not limited to CCDs. A number of various technologies can be used, depending on the specific requirements of each application. These may include amorphous silicon flat panels (a-Si:H), position sensitive avalanche photodiodes (PSAPD), position sensitive PMTs, CMOS arrays. (Non digital readout includes film.) The sensor can also be used with such readouts as multi-anode photomultiplier tubes (MAPMTs), which will render a minimum dead time and a true count rate in excess of 10⁶ CPS.

For the applications requiring a high sensitivity optical detector (for example, low flux scattered radiation) a novel EMCCD can be used. The new internal gain CCD, developed by Marconi (now marketed by E2V Technologies), works like a conventional CCD, except that it provides an internal gain via an avalanche mechanism. This new device combines properties of two well-known silicon detectors, the high resolution and low noise of a CCD, and the internal gain and very high sensitivity of an APD. Thus, an imaging system based on the EMCCD does not require the use of intensification stages even though it provides detection of extremely low light levels. In contrast to the intensified CCDs (ICCDs), the EMCCD provides superior quantum efficiency over 400 nm to 1050 nm wavelengths, substantially better resolution (MTF(f)), significantly wider dynamic range, and low sensitivity to over-exposures, resulting in an improved image quality at a lower cost.

This device, models #CCD87 and CCD97 manufactured by Marconi E2V Technologies, is a frame transfer device which operates in inverted mode to suppress dark current. It consists of a 256 K pixel imaging zone formed by 512×512 pixels, each measuring 16×16 μm in size. Additional 512×512 pixel area, which is masked by an optical shield, is used as an on-chip frame storage zone. After the image is transferred in to the frame storage zone, the data is shifted up vertically one row at a time into the serial register. Once in the serial register, charge packets are individually shifted toward the output amplifier and the operation is repeated until the entire image is read. Electron Multiplying CCD (EMCCD) and Intensified CCD (ICCD) can also be used in these teachings, Gadolinium is an element which has two isotopes with high natural abundance: Gd$^{155}$ (14.7%) and Gd$^{157}$(15.7%) with high thermal neutron cross-sections of 6.1×10⁴b and 2.6×10⁵b respectively, which makes it very attractive as a neutron converter. As a result of neutron interaction with Gd atoms conversion electrons are created:

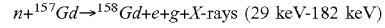

$n+^{157}Gd \rightarrow ^{158}Gd+e+g+X\text{-rays}$ (29 keV-182 keV)

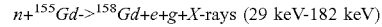

$n+^{155}Gd \rightarrow ^{158}Gd+e+g+X\text{-rays}$ (29 keV-182 keV)

The use of pure Gd as a converter has been investigated in previous work. However, it has been established that the dark color of Gd is limiting the performance of the CsI scintillator, reducing its light output significantly. Furthermore, unless a protective layer is applied on the interface between CsI and Gd, the two materials react, degrading the integrity of the scintillator. Introducing the protective/reflective layer, however, decreases the scintillator detection efficiency, because a portion of the conversion electrons stops in the protective layer and never reaches the scintillator.

As an alternative approach, the use of GdF3 has been investigated as a converter. This material is transparent to the scintillator light and can be applied in "sandwich configuration", where both sides of the scintillator were coated with GdF3. The results of this research were very encouraging. However, since there is a higher content of Gd in Gd2O3 than in GdF3 a higher efficiency is expected with the present sensor. Results have demonstrated that a higher image contrast can be attained with a Gd2O3 converter as it was expected. Also, Gd2O3 is transparent allowing us to form a sandwich configuration for enhanced neutron absorption without the loss of scintillation light generated in the CsI(Tl) layer.

The literature mentions a successful application of gadolinium oxide as a neutron converter for thermal imaging with imaging plates. The efficiency of the detector of these teachings is increased by depositing Gd2O3 on both sides of the scintillator. Furthermore, the efficiency is increased due to the detector pixelation, which increases the converter-covered area up to 5-fold (on 5 sides of the 3-dimensional pixels). Gd2O3 is transparent to the scintillator light and has a refractive index ~1.88 at 550 nm, which matches well with that of CsI(Tl) (nCsI=1.78).

Choice of Digital Readout

The thermal neutron detector includes of a high light output, high resolution pixelated microcolumnar CsI(Tl) film coated with a thin Gd2O3 converter layer on either side, optically coupled to a digital readout as shown in FIG. 1.

Figure 2:
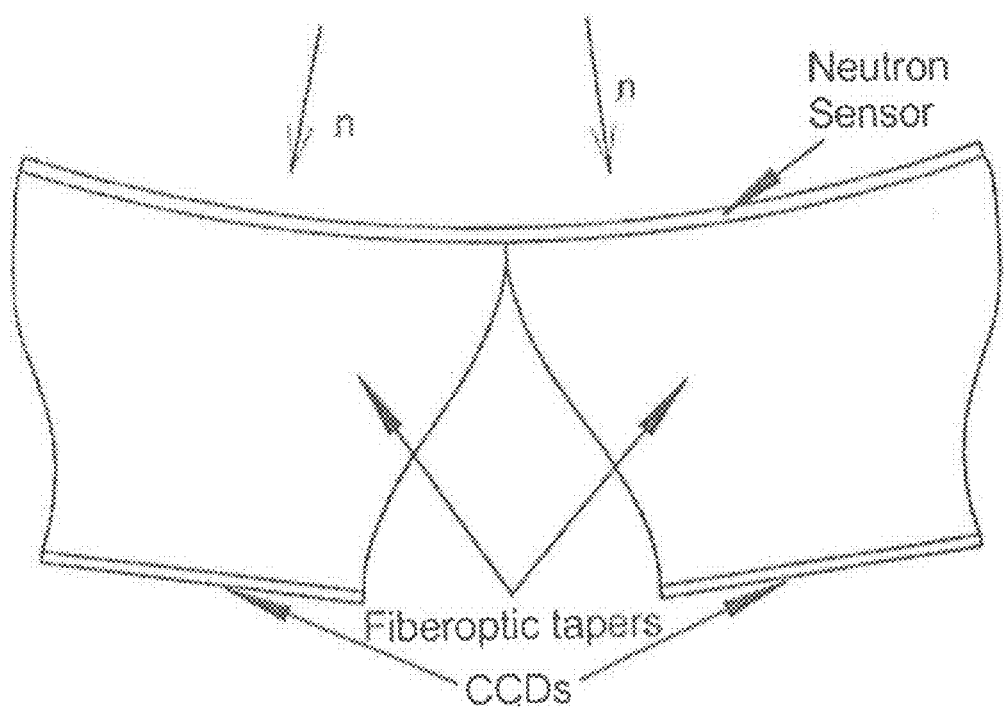
FIG. 2 is an arrangement of several CCD-based detectors if a spherical geometry is required.

In one embodiment, a CCD readout is used, because of its low noise, high dynamic range, high spatial resolution and real-time output, needed for crystallography applications. A possible arrangement for a crystallography experiment would include several detectors tiled together. Each detector may have a fiberoptic taper with a concave top surface to accommodate spherical geometry (see FIG. 2, for example). In this case, the scintillator could be directly deposited onto the taper to form a spherical surface. Sensors of various sizes up to 30 cm×30 cm can be obtained in order to investigate a scaling up ability of this technology. As it stands now, there are no CCD/taper cameras available with a large area to match this size. The largest commercial camera is produced by Fairchild Imaging (20 cm diameter taper). However, the large area sensors could be used with a lens-based CCD system or a low-noise flat panel array. A number of various technologies can be used for digital reaadout, depending on the specific requirements of each application. These may include amorphous silicon flat panels (a-Si:H), position sensitive avalanche photodiodes (PSAPD), position sensitive PMTs, CMOS arrays.

The imaging system would have a substantial benefit for the neutron community and industries conducting neutron research in biology, pharmacology, condensed matter physics, material science, and fundamental physics. Small angle neutron scattering instruments, powder diffractometers, and backbone of academic and industrial research in neutron science. The detector will offer stable operation, reliable calibration, and real-time image acquisition, processing and sharing. Simplicity of operation will facilitate training of young researchers in the area and will promote the use of thermal neutrons as a biomedical research tool.

The sensor coupled to a suitable readout can be used in a variety of applications where thermal neutrons are used as a probe. Large area will make this sensor attractive not only to biomedical research community, but for NDT industry and homeland security needs as well. The sensor could be incorporated into such applications as water (or oil) content evaluation, art objects authentication, illicit material detection, and neutron tomographic systems.

"Sandwich" Gd2O3/CsI/Gd2O3 sensors on up to 7.5 cm×7.5 cm glass have been produced, on fiberoptic and aluminum substrates. The CsI(Tl) films were pixelated using laser micro-machining to form an array of ~100 tm pixels and the second converter layer was deposited on top. The resulting screens were optically coupled to a fiberoptic based CCD system to form an imaging detector module. The detector module was characterized, and subjected to imaging tests at the facilities of the University of Massachusetts Lowell Research Reactor to assess its efficiency and image quality and to prove the validity of our approach. The results clearly demonstrated producing a neutron imaging detector with superior combination of spatial resolution, high S/N ratios, high detection efficiency, excellent response uniformity, and fast decay time. Development of such a system should be of significant interest for crystallography and has a potential to advance the field of molecular structure as well as biological research. The development of a large area scintillator screen is of interest to many other applications such as non-destructive testing, homeland security, etc.

This layer of gadolinium oxide serves as the first converter layer encountered by incident neutrons, where they produce conversion electrons. To obtain the highest possible detection efficiency for the incident neutrons, while allowing the conversion electrons to escape, an appropriate thickness of Gd2O3 was calculated to be 10-12 microns. The melting point of Gd2O3 (2330C) is too high for thermal evaporation. A special technique has been developed using e-beam gun to evaporate this compound. To achieve the desired thickness of Gd2O3 (12 micron), a tandem deposition approach had to be used due to the limited size of the Gd2O3.target. Due to the enhanced thermal stresses during deposition, substrate cracking was found to be a major problem. This issue was resolved by very gradual heating of the source material rather than increasing the source to substrate distance, which reduced the deposition rate. The speed of deposition was carefully monitored to ensure good adhesion to substrate with no additional cracking. In the first run about 5 micron of the converter material was deposited. Additional 6 micron were deposited to bring the total thickness to the target thickness of 10-12 micron Several substrates have been used for this task, including glass, fiberoptic and Al. The best adhesion and no creasing of Gd2O3 layer deposited has been observed on specially prepared Al substrates. Prior to deposition these aluminum substrates were subjected to plasma cleaning procedures to promote good adhesion of the film. The required raw Gd2O3 in pellet form was obtained from Messrs. Alfa Aesar.

For the alternate embodiment using GdF3, the effective thermal neutron crossection for GdF3, which will be used as a converter in this application, is lower than that for pure Gd. Consequently a thicker converter layer than that used for Gd is required to achieve similar detection efficiency. Estimates show that 8 to 20 micron thickness of each converter layer will be sufficient to provide >90% stopping power for thermal neutrons.

Vapor deposition of micro-columnar CsI(Tl) films is the next step in developing the sensor.

Figure 3:
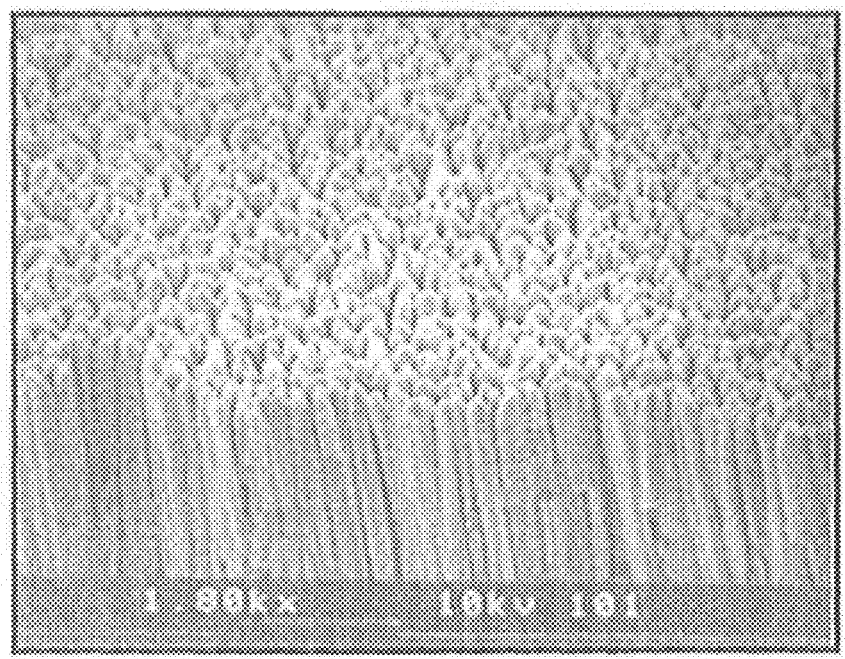
FIG. 3 is an SEM of a 30 μm thick CsI(Tl) film, showing an excellent microcolumnar structure.

All the necessary facilities including the clean rooms, evaporators, etc. are readily available for film fabrication. The CsI(Tl) vapor deposition protocols to manufacture microcolumnar films are well established and this task was accomplished with no difficulties. A specially designed planetary system was used to ensure better than 0.3% thickness uniformity over the 5×5 $cm^2$ area of the sample. Since small variations in CsI(Tl) film thickness can cause problems in focusing the laser the laser beam during the etching procedures, uniformity of the sample is a critical requirement. The concentration of Tl activator in the evaporated films was also carefully controlled as this determines the light output properties of the film. Several film of thickness between 20 to 60 μm have been produced. Scintillator layers of less than 20 μm are within the scope of these teachings. A representative SEM micrograph of one of the films is shown in FIG. 3. This was done in order to experimentally check the optimal CsI thickness to ensure good light output, while maintaining low sensitivity of the sensor to the gamma radiation. (Most of the short-range conversion electrons from gadolinium have energies between 30 keV and 80 keV, and a range of <30 μm in microstructured CsI film.)

Pixelation can be part of the design of these teachings. The pixelated screen geometry helps in depositing the converter layer in a conformal manner on the films, thus improving the overall detection efficiency. Additionally, the pixelated structure confines the lateral light spread of scintillation light to within the volume of the pixel and enhance the contrast resolution of the screen.

Figure 4:
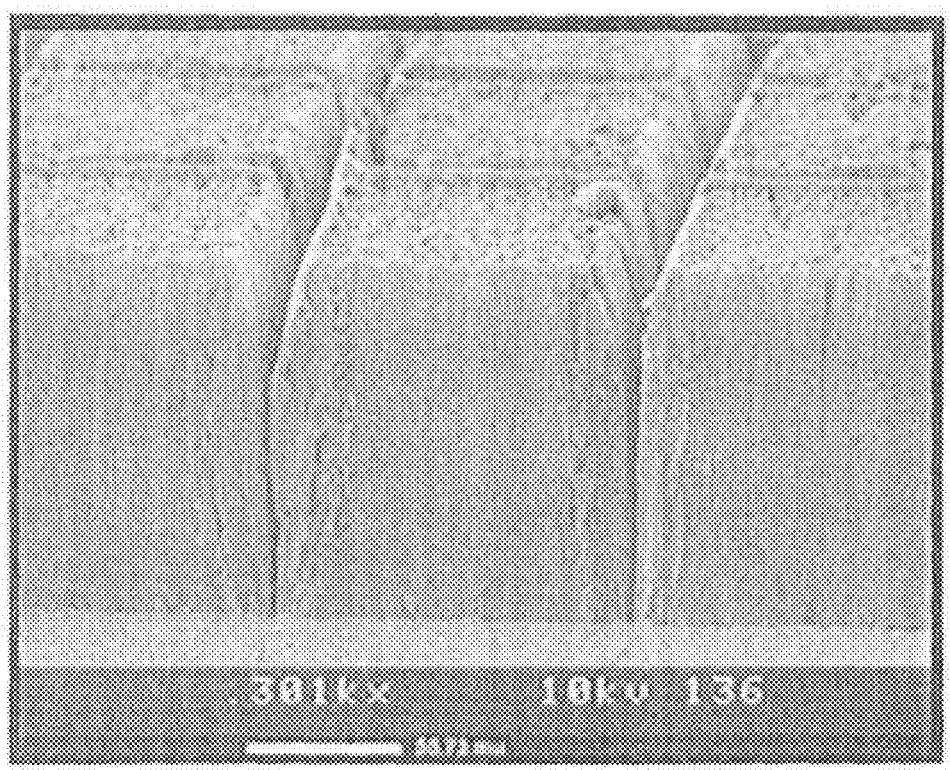
FIG. 4 shows An SEM of a pixilated CsI sensor, showing 3-dimensional Pixels; The microcolumnar structure of CsI is also visible within the pixels.
Figure 6:
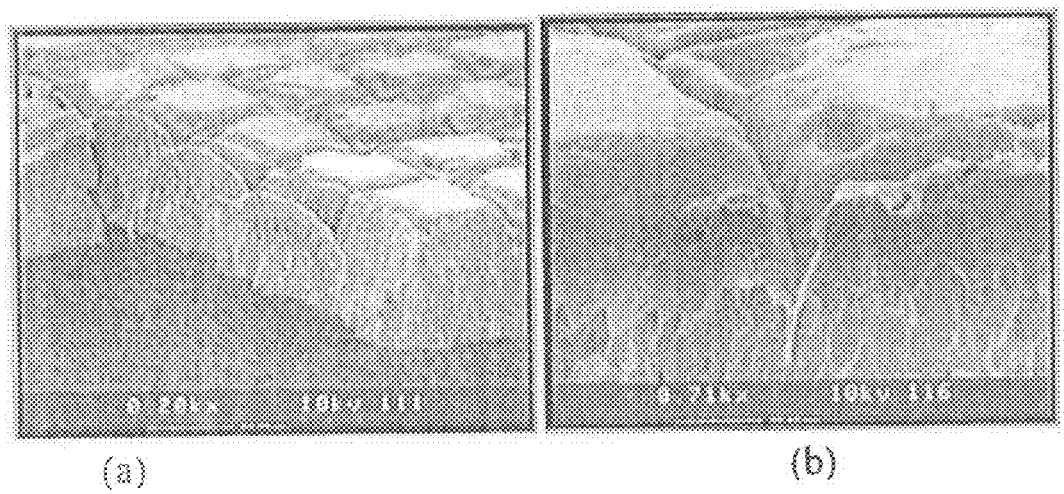
FIG. 6 (a) SEMs of a pixelated CsI sensor coated with a Gd2O3 layer. (b) Close up of the coating on 2 adjacent pixels.
Figure 7:
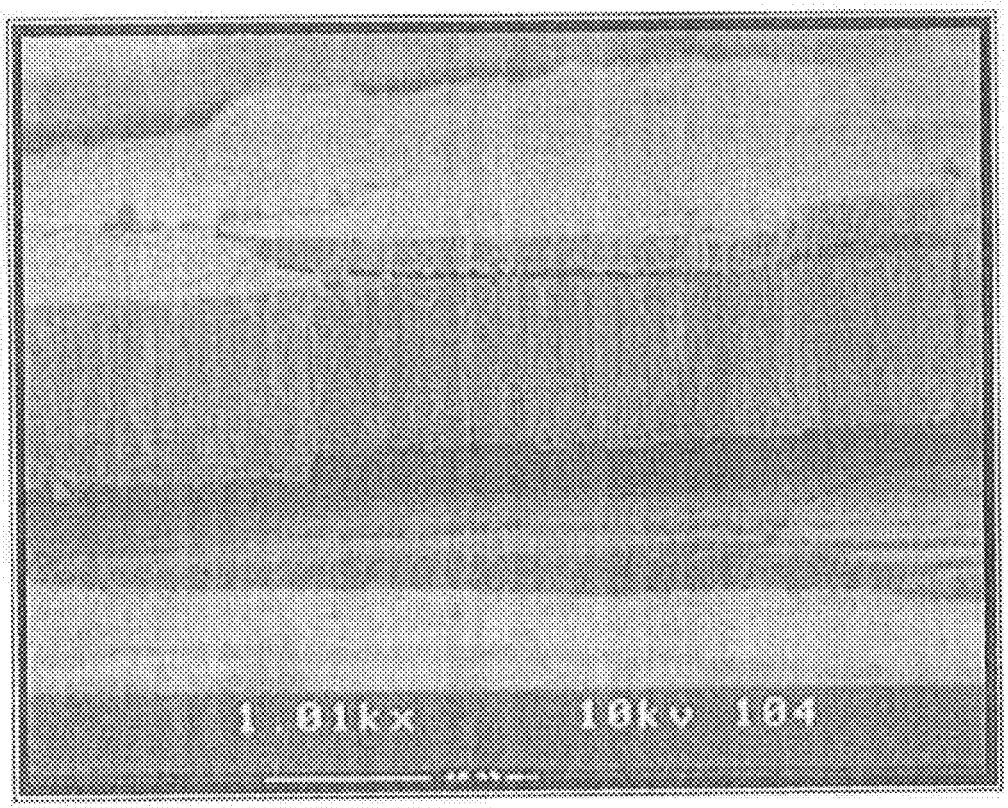
FIG. 7 An SEM of a triple layer scintillator structure; A 30-micron layer of CsI(Tl) is sandwiched between 2 layers of 5 micron Gd2O3 neutron converter; The layer delamination observed in this figure is due to the mechanical stress applied during the sample preparation for the SEM.

Selected CsI(Tl) screens were subjected to laser pixelation procedures using an excimer laser at Resonetics Inc., Nashua, N. H. Initially, the experimental substrates were subjected to etching using ArF (193 nm) laser energy densities in the range of 10 to 50 mJ/$cm^2$. The laser pulse duration and the number of pulses were varied to optimize the etching process for a given thickness of CsI(Tl) film. After each exposure a profile of the resulting cut was carefully studied using an optical microscope and selected profiles were subjected to detailed investigation using an SEM (FIG. 4). The information obtained from these investigations was used to fine-tune the various laser parameters to accomplish the highest etching rates while maintaining the beam entrance window to the minimum. Specifically, the on-target density, frequency of laser pulses, and the number of pulses per spot were standardized and implemented during the etching experiments. CsI(Tl) films were etched with narrow, clean and well defined "V" shaped interpixel grooves, having entrance windows of ~5 μm, going down to ~1 μm at the bottom. Adding a film of gadolinium oxide to a cesium iodide film is a new process, which was attempted for the first time. The deposition of this layer was also performed at CMSE laboratory at MIT, Cambridge, Mass., using the e-beam evaporator to form a conformal layer of gadolinium oxide on the surface of the CsI(Tl) pixels as well as the side walls of the grooves (see FIG. 6). As before, the deposition was done in tandem fashion to achieve thicker converter layer. The total thickness of the top layer was ~8

Figure 5:
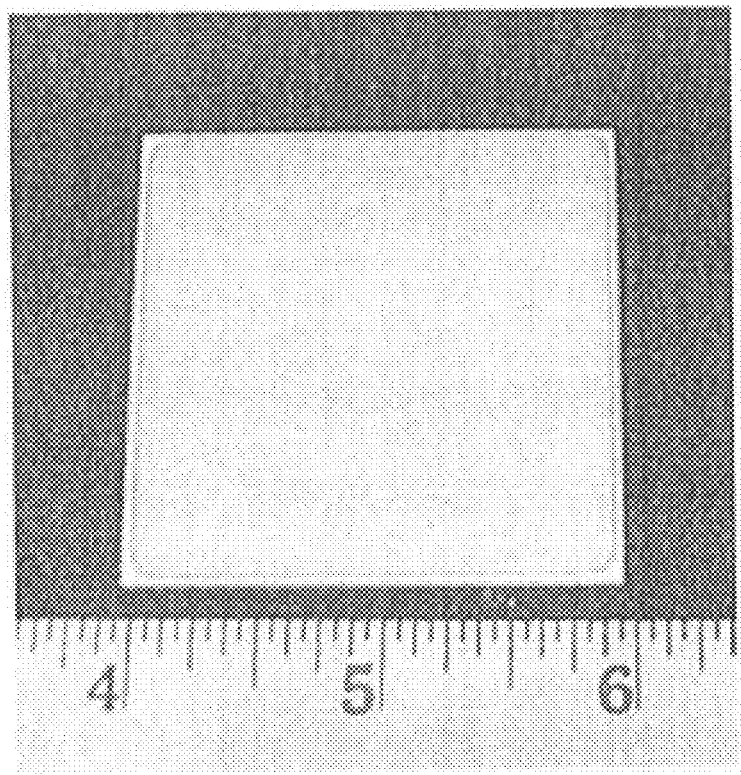
FIG. 5 is A photograph of a neutron sensor of these teachings.

The resulting triple layer structure is shown in FIG. 5. A photograph of one of the screens is shown in FIG. 5.

At every step of the sensor manufacturing, the morphology of each layer was evaluated using SEM available in-house. The performance of the scintillators was evaluated initially at RMD under X-ray excitation. The scintillators were coupled to the CCD camera available at RMD (Photometrics 1K×1K cooled fiberoptic taper-based system). This camera uses a Peltier-cooled CCD with 19 μm pixel size, bonded to a 3:1 demagnification ratio fiberoptic taper. The effective active area at the large end of the taper is ~6 cm×6 cm and the corresponding effective pixel size is 57 μm providing a spatial resolution of 8.7 lp/mm. The 14 bit digitized image data is stored in a PC for future analysis. A tunable x-ray generator (10 kVp to 100 kVp) with a tungsten target was used for these measurements. The light output of the sensors was measured under 40kVp X-rays and 12.5 mAs as our standard procedure for CsI(Tl) films of this thickness prescribes.

Figure 8:
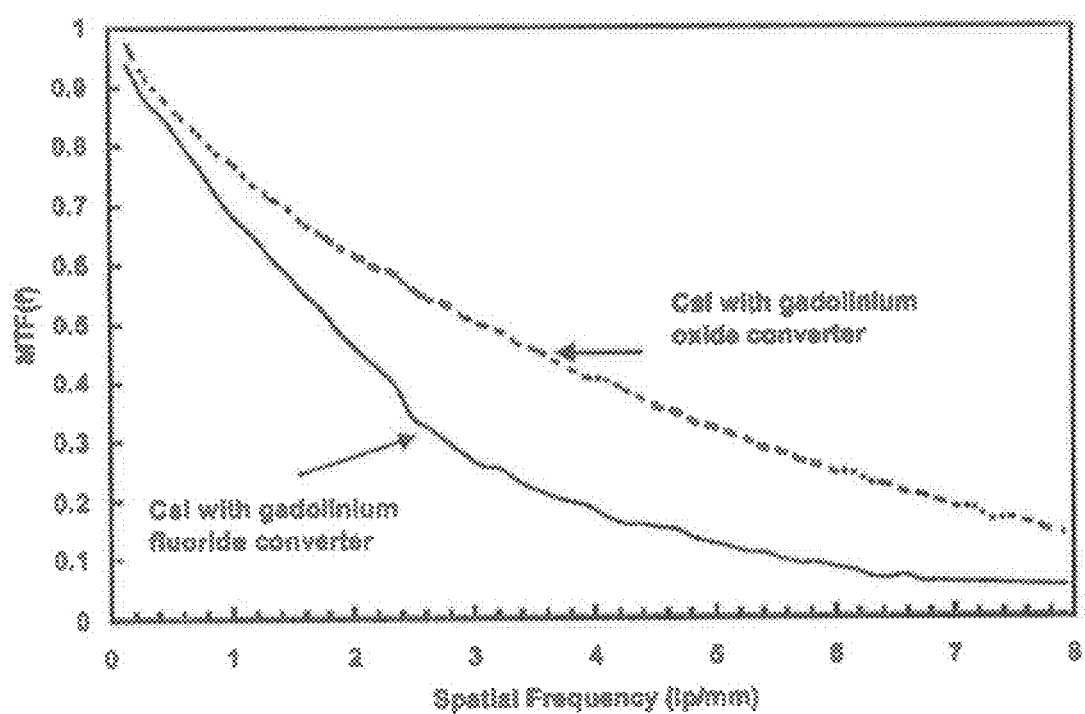
FIG. 8 represents Modulation transfer function (MTF) as a function of spatial frequency as measured with x-rays for two different types of converters: with gadolinium oxide and gadolinium fluoride. Notice the higher MTF(f) for the sensor with Gd2O3 converter.

In order to evaluate the spatial resolution of the films a pre-sampled line spread function (LSF) was measured, followed by a fast Fourier transform (FFT) of the LSF to obtain a modulation transfer function (MTF(f)) [63]. A 10 μm wide Tantalum slit (Nuclear Associates 07-624) oriented at a<1° angle relative to the CCD pixel row (or column) direction was placed on the top of the sensor and an X-ray image of the slit was obtained and used to calculate the presampled LSF with a sampling interval of 0.7 μm or less, as described in reference [63]. The resulting MTF(f) is presented in FIG. 8. A 10% MTF(f) is observed at over 8 line pairs per millimeter, which is close to the CCD's Nyquist limiting resolution of the CCD. It should be noted that these tests merely provide the intrinsic light output and spatial resolution of the scintillator screens under excitation of incident radiation and do not to measure the neutron detection performance.

Figure 9:
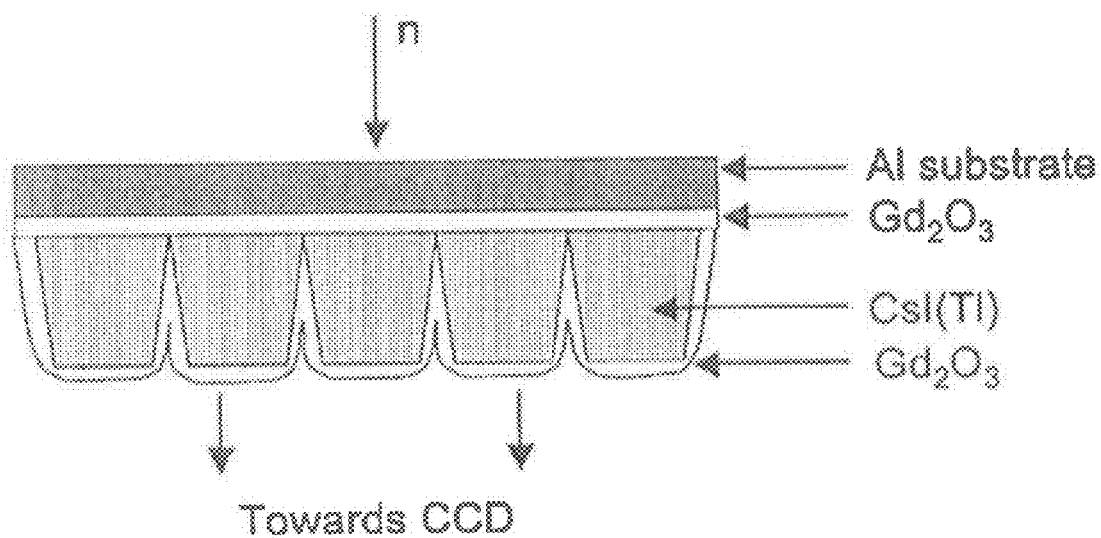
FIG. 9 is a graphical representation of one embodiment of the sensor of these teachings.

FIG. 9 shows the first exemplary embodiment.

In other embodiments, the neutron sensitive layer is a foil of neutron sensitive material. "Foil," as used herein, includes foils made by thin film deposition such as those described in Gabriel M. Veith and Nancy J. Dudney, Preparation of Thin-Film Neutron Converter Foils for Imaging Detectors, 2003 IEEE Nuclear Science Symposium. Conference Record (IEEE Cat. No. 03CH37515), which is incorporated by reference herein in its entirety and for all purposes. In one instance, the neutron sensitive layer is one of dysprosium foil or indium foil, and, the scintillator layer is vacuum deposited onto the neutron sensitive layer. In another instance, the neutron sensitive layer is one of Gd foil or Li foil, and, the scintillator layer is vacuum deposited onto the neutron sensitive layer.

Second Exemplary Embodiments

In one exemplary embodiment, dysprosium and indium foil activators are used in conjunction with CsI:Tl scintillator layer. The foils get activated by the neutron exposure, generating secondary radiation over a period of time, which interacts in CsI layer. The light produced by CsI scintillator is subsequently detected by the film and/or a digital detector such as a photographic film CCD or a CMOS sensor. Data acquisition times can be long. Having CsI scintillator deposited on the foils the secondary radiation interactions are enhanced substantially, minimizing data acquisition times.

In another exemplary embodiment, Gd or Li are used in conjunction with CsI:Tl scintillator layer. Unlike dysprosium and indium activators, Gd or Li foils do not get activated, but promptly emit secondary radiation with a high Q value. This radiation is detected by the scintillator film and the light generated in response is imaged by an optical detector. Again, the detector could be CCD, CMOS, or a-Si:H arrays, photodiodes, SiPMs etc. or even a photographic film.

Figure 10:
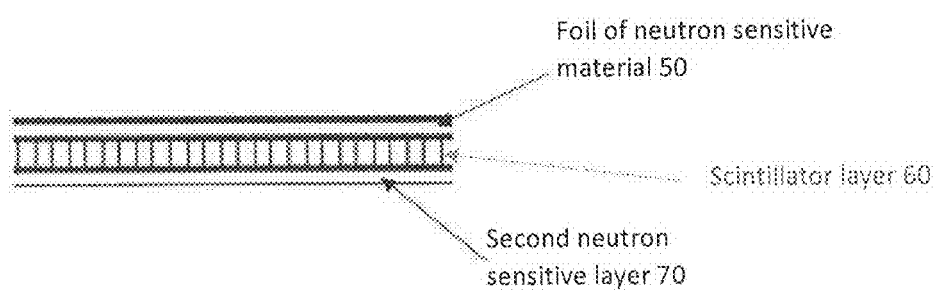
FIG. 10 is a graphical representation of a portion of another embodiment of the sensor of these teachings.

FIG. 10 shows of portion of the second exemplary embodiment. Referring to FIG. 10, in the embodiment shown therein, a microcolumnar scintillation layer 60 is deposited on a foil of neutron sensitive material 50. As second neutron sensitive layer 70 is in close proximity to another end surface of the microcolumnar scintillation layer 60.

In another embodiment, the neutron sensitive layer is a layer of neutron sensitive material in powder form. The scintillator layer extends from a first side surface to a second side surface and the layer of neutron sensitive material is deposited on the first side surface. In one instance, the neutron detection device also includes comprising a protective coating deposited on the layer of neutron sensitive material. In one instance, neutron sensitive material in powder form comprises one of lithium, boron, gadolinium, cadmium, indium, dysprosium. In another instance, the scintillator layer is vacuum deposited on a substantially optically transparent substrate. Embodiments including a second neutron sensitive layer in close proximity to the second side surface of the scintillator layer, the second neutron sensitive layer being deposited on a surface of the substantially optically transparent substrate on which the scintillator layer will be subsequently deposited are also possible.

Figure 11:
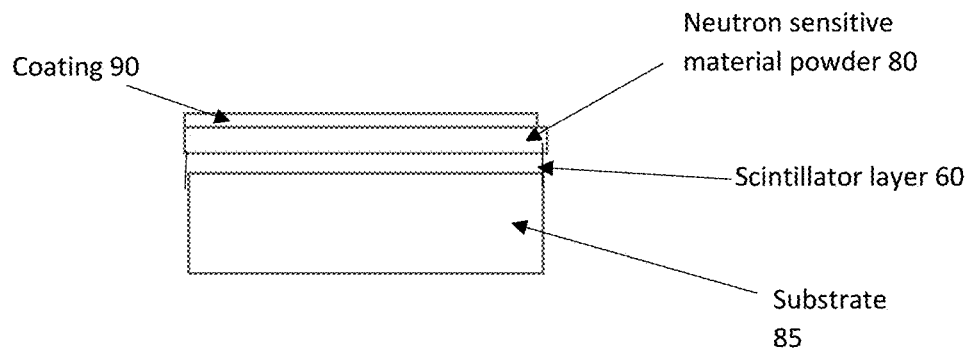
FIG. 11 is a graphical representation of yet another embodiment of the sensor of these teachings.

FIG. 11 shows an embodiment in which the neutron sensitive layer is a layer of neutron sensitive material in powder form. Referring to FIG. 11, in the embodiment shown there in, a layer of neutron sensitive material in powder form 80 is disposed on the scintillator layer 60. The scintillator layer is deposited on a substantially optically transparent substrate 85. A protective coating 90 is deposited on the layer 80 of neutron sensitive material in powder form.

Third Exemplary Embodiment

Figure 12:
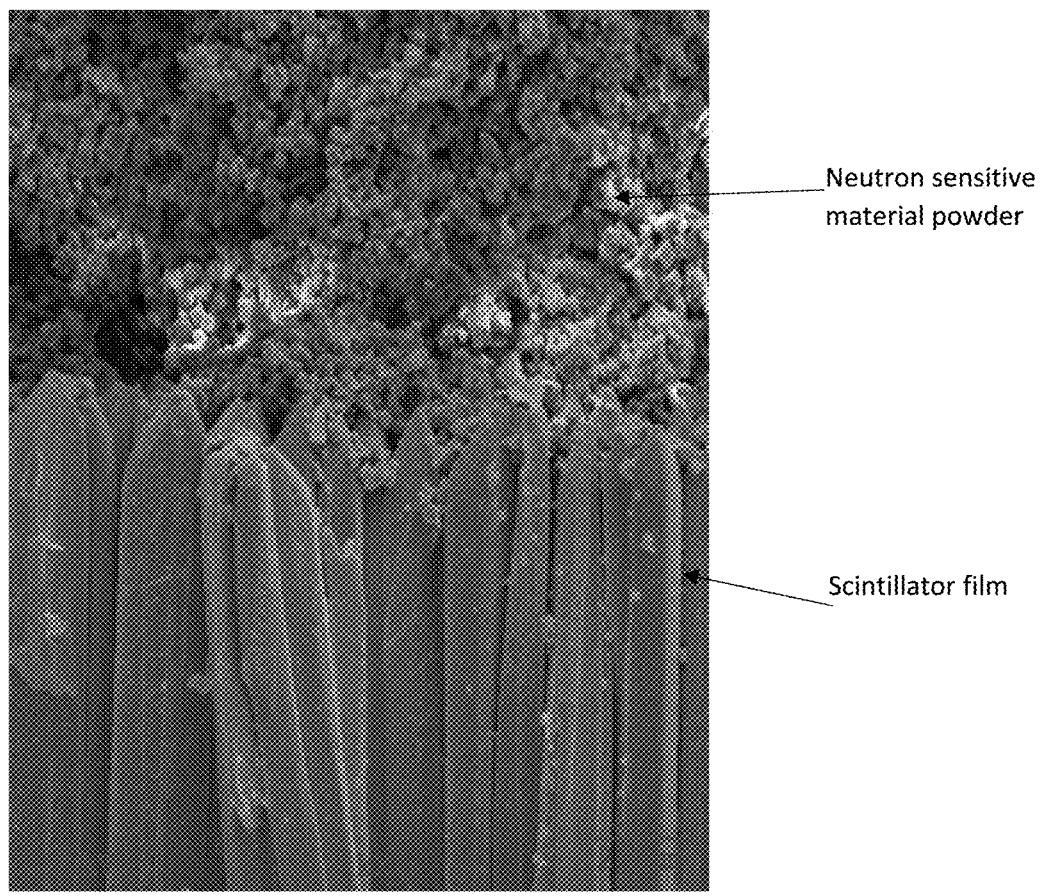
FIG. 12 is a pictorial representation of a portion of an embodiment of the sensor of these teachings.

In this exemplary embodiment, the columnar CsI:Tl films were first deposited on substrates by a vapor deposition method. Enriched $^6$LiF powder without any added binder was then applied to the top surface directly in contact with the CsI:Tl columns as shown in FIG. 12. The film was then coated with a Parylene C protective coating which functions to not only protect against moisture degradation, but also to hold the LiF powder intact. FIG. 12 shows the LiF/CsI:Tl interface where powder is in close contact with the CsI:Tl columns.

When a second neutron sensitive layer is disposed between the scintillator layer and the light-sensitive device, there are embodiments in which a second scintillator layer is located in close proximity to the second neutron sensitive layer, the second scintillator layer extending from a third side surface to a fourth side surface, the third side surface being located in close proximity to the second neutron sensitive layer, and a third neutron sensitive layer is disposed in close proximity to the fourth side surface of the second scintillator layer, the second scintillator layer and the third neutron sensitive layer at disposed between the second neutron sensitive layer and the light-sensitive device. The second scintillator layer is vacuum deposited on the second neutron sensitive layer, and the third neutron sensitive layer is vacuum deposited on the second scintillator layer.

Fourth Exemplary Embodiment

Figure 13:
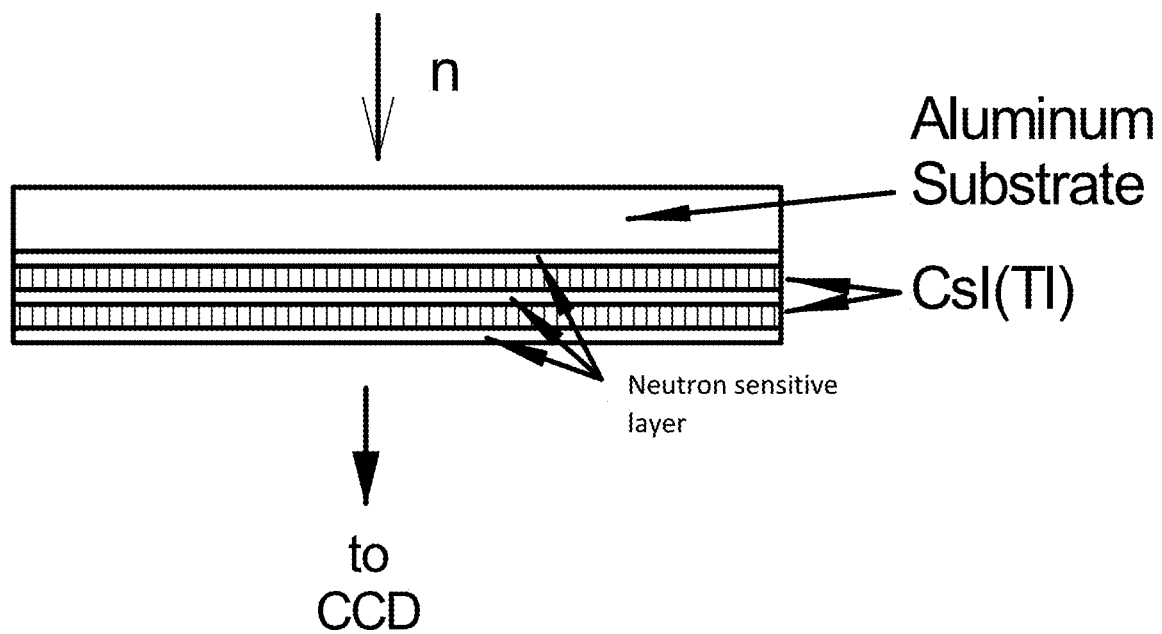
FIG. 13 is a graphical representation of still another embodiment of the sensor of these teachings.

The schematics of the fourth exemplary embodiment is presented in FIG. 13. An important component of the detector is a large area (30 cm×30 cm) high resolution, high efficiency, scintillator coupled to a digital detector such as a CCD or an amorphous silicon flat panel (a-Si:H). In the exemplary embodiment, the scintillator screen includes layers of microcolumnar CsI(Tl) film scintillator each sandwiched between two layers of gadolinium fluoride ($GdF_3$) neutron-sensitive converter (FIG. 13). Gadolinium fluoride is transparent to the scintillator light. The conversion electrons of ~30-80 keV produced by the neutrons in both converter layers will be detected by CsI(Tl) to produce visible light, which will penetrate the converter layers to reach the readout detector. Because of the microcolumnar structure of the CsI(Tl) scintillator, the light will be channeled towards the CCD with the minimal lateral spread. Thus, this combination serves as a very efficient neutron sensor (at least ~80% neutron detection efficiency), which generates a high light output signal due to the excellent scintillation properties of CsI(Tl) (60000 photons/MeV), and has a better than 100 μm spatial resolution due to the microcolumnar structure of the scintillator.

In another embodiment, a tapered optical fiber is disposed between the scintillator layer and the light-sensitive device. The scintillator layer extends from a first side surface to a second side surface, the first side surface being located in close proximity to the neutron sensitive layer. In one instance, the neutron detection device also includes a second neutron sensitive layer in close proximity to the second side surface of the scintillator layer, the second neutron sensitive layer being disposed between the scintillator layer and the tapered optical fiber. The tapered optical fiber has an input surface and an output surface. In one instance, the scintillator layer is disposed on the input surface. In some embodiments, the input surface of the tapered optical fiber is curved and has a concave shape. In another instance, the second neutron sensitive layer is disposed on the input surface, and the scintillator layer is disposed on the second neutron sensitive layer.

Figure 16:
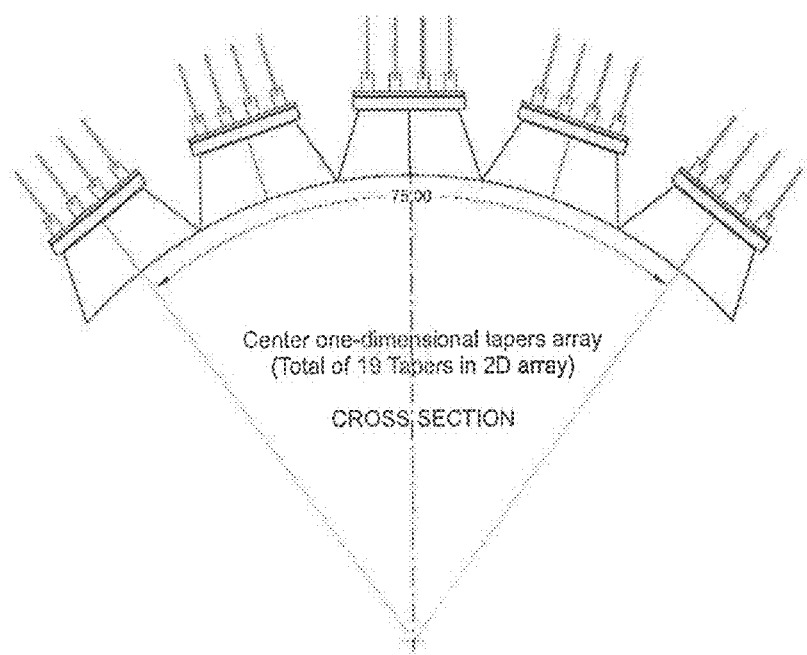
FIG. 16 is a graphical representation of a cross-section of a sensor arrangement of these teachings.

The use of a fiberoptic taper serves two purposes, namely, to increase the active imaging area of the detector and to provide a shield for the light sensitive device, such as a CCD chip, from neutron radiation. The front surface of the taper can be made concave to fit spherical geometries. A significant advantage of this approach is that a number of such detectors can be tiled edge to edge, to cover more of a spherical detection surface as shown in FIGS. 14B and 16. This is particularly important for applications needing maximum solid angle coverage, for example in crystallography studies. CCD as an optical readout detector is a good choice for crystallography applications because of the low noise and high resolution operation. Maintaining the spatial resolution over large detector area and minimizing dead results from a curved detector that minimizes parallax errors and boundary regions without sacrificing its intrinsic resolution or the efficiency. The detector includes fiberoptic reducers (tapers) coupled to a light sensitive component, such as SiPM photodetectors. The large end of the fiberoptic taper will have the desired curvature. In one instance, the large end of the fiberoptic taper has a radius between 10 and 40 cm. In one embodiment, the scintillator, such as a LNI scintillator, is directly deposited on to the curved fiberoptic using, for example, evaporation techniques.

Fifth Exemplary Embodiment

Figure 14A:
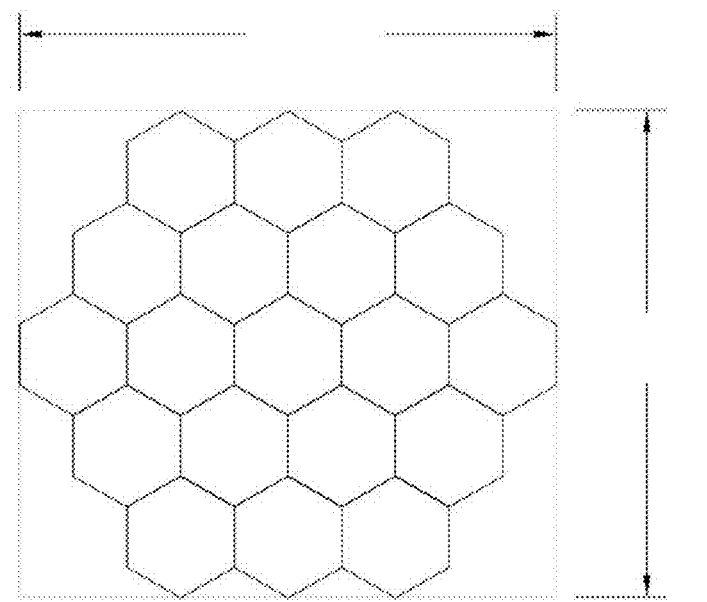
FIGS. 14A and 14B are schematic representations of a sensor arrangement of these teachings.
Figure 14B:
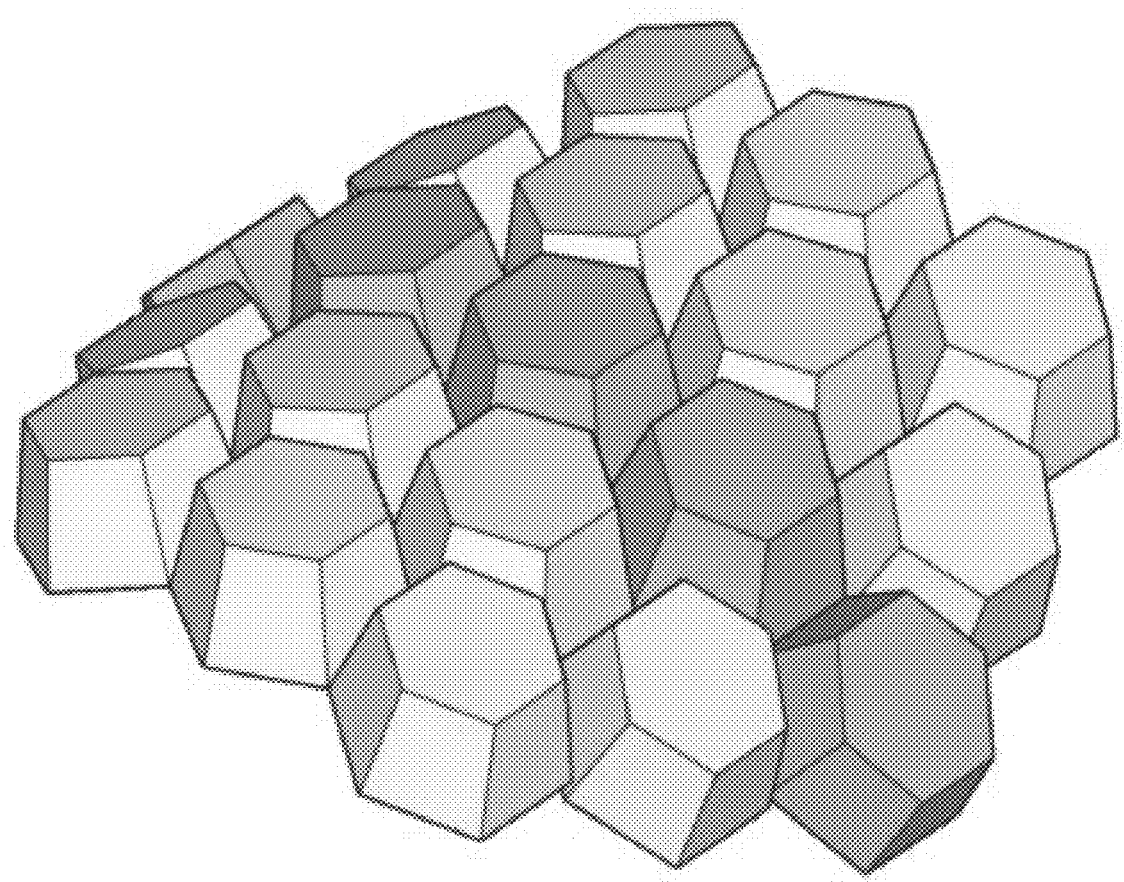
Figure 15:
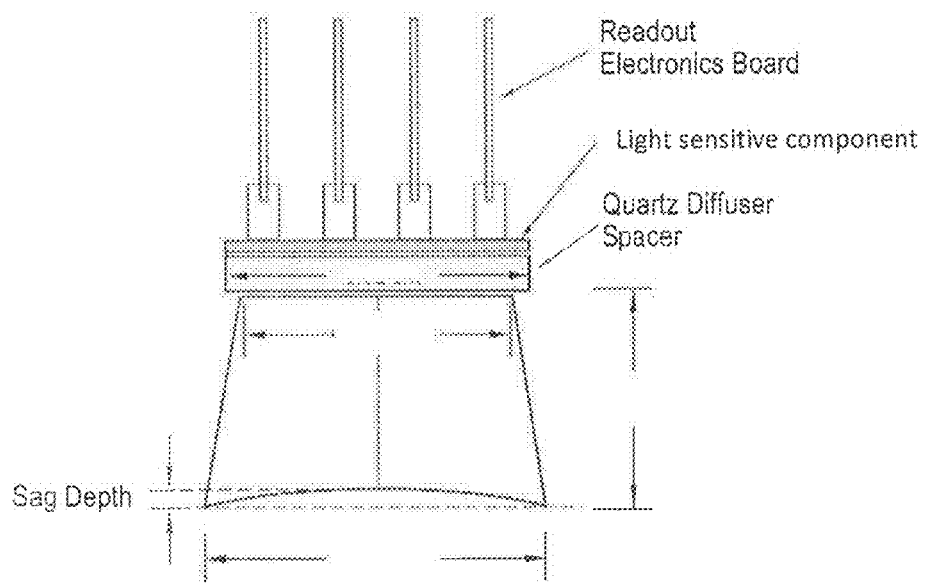
FIG. 15 is a graphical representation of a cross-section of one embodiment of the sensor of these teachings.

To achieve a true spherical surface, the fiberoptic tapers are hexagonal shaped (FIGS. 14A, 14B). The embodiment shown in FIGS. 14A, 14B include 19 tapers. The taper arrangement is shown in FIG. 14A, and the 3D visualization of the assembled array is shown in FIG. 14B. The cross section of one taper is shown in FIG. 15 and the cross-section of the middle row of 5 tapers is shown in FIG. 15

In one or more embodiments, the method of these teachings for fabricating a neutron detection device includes placing a first end surface of a scintillator layer in close proximity to a neutron sensitive layer, the neutron sensitive layer absorbs the neutrons and converts the energy from the neutron into another form of energy such as electrons, betas or gammas and the scintillator layer absorb energy emitted from the layer of neutron sensitive material to convert the energy into optical photons, the neutron sensitive layer being one of foil of neutron sensitive material or a layer of neutron sensitive material in powder form; and operatively optically connecting a light sensitive device to a second end surface of the scintillator layer in order to detect the optical photons from the scintillator.

In one embodiment, the scintillator layer is vacuum deposited on the neutron sensitive layer. In one instance, the neutron sensitive layer is a foil of neutron sensitive material. In another instance, the scintillator layer is pixelated before operatively optically connecting the light-sensitive device to the second end surface of the scintillator layer. In yet another instance, a second neutron sensitive layer is vacuum deposited on the second surface of the scintillator layer.

In another embodiment, the scintillator layer is vacuum deposited on a substantially optically transparent substrate, the neutron sensitive layer being in close proximity to a first end surface of the scintillator layer, and a second end surface of the scintillator layer being disposed on the substantially optically transparent substrate. In one instance, the neutron sensitive layer is formed by depositing a neutron sensitive material in powder form on the first end surface of the scintillator layer. In another instance, the neutron sensitive material in powder form is coated with a protective coating.

In one embodiment, the optically transparent substrate is a tapered optical fiber. The tapered optical fiber has an input surface and an output surface. In one instance, the scintillator layer is disposed on the input surface. In some embodiments, the input surface of the tapered optical fiber is curved and has a concave shape. In another instance, the second neutron sensitive layer is disposed on the input surface, and the scintillator layer is disposed on the second neutron sensitive layer. The tapered optical fiber has an input surface and an output surface. In one instance, the scintillator layer is disposed on the input surface. In some embodiments, the input surface of the tapered optical fiber is curved and has a concave shape. In another instance, the second neutron sensitive layer is deposited on the input surface, and the scintillator layer is disposed on the second neutron sensitive layer, deposition of the second neutron sensitive layer occurring before deposition of the scintillator layer.

In embodiments in which the optically transparent substrate is a tapered optical fiber and the input surface of the tapered optical fiber is curved and has a concave shape, the method of these teachings for reducing parallax errors includes fabricating two or more neutron detection devices using the method as disclosed herein above and placing the two or more neutron detection devices side-by-side such that the curved surfaces tessellate a predetermined, such as, for example, spherical, surface.

Although these teachings has been described with respect to various embodiments, it should be realized these teachings are also capable of a wide variety of further and other embodiments within the spirit and scope of these teachings.

The invention claimed is:

1. A neutron detection device for neutron radiography comprising:
   a neutron sensitive layer that absorbs the neutrons and converts energy from the neutron into another form of energy such as electrons, betas or gammas; wherein the neutron sensitive layer is one of foil of neutron sensitive material or a layer of neutron sensitive material in powder form;
   a microcolumnar scintillator layer located in close proximity to the neutron sensitive layer, the scintillator layer configured to absorb energy emitted from the neutron sensitive layer to convert the energy into optical photons; and
   a light sensitive device configured to detect the optical photons from the microcolumnar scintillator layer and to form an image;
   wherein the scintillator layer extends from a first side surface to a second side surface; wherein the first side surface is located in close proximity to said neutron sensitive layer; and the neutron detection device further comprises a second neutron sensitive layer in close proximity to the second side surface of the scintillator layer; the second neutron sensitive layer being disposed between the scintillator layer and the light sensitive device.

2. The neutron detection device of claim 1 wherein said neutron sensitive layer comprises one of lithium, boron, gadolinium, cadmium, indium, dysprosium or compounds thereof.

3. The neutron detection device of claim 1 wherein said scintillator layer is composed of CsI:Tl, CsI:Na, LaBr$_3$:Ce, CeBr$_3$, or Tl or Eu doped Lithium Sodium Iodide (Li$_x$Na$_{1-x}$I:Tl,Eu).

4. The neutron detection device of claim 1 wherein the neutron sensitive layer is one of dysprosium foil or indium foil; and, wherein the scintillator layer is vacuum deposited onto said neutron sensitive layer.

5. The neutron detection device of claim 1 wherein the neutron sensitive layer is one of Gd foil or Li foil; and, wherein the scintillator layer is vacuum deposited onto said neutron sensitive layer.

6. The neutron detection device of claim 1 wherein the scintillator layer is a pixelated scintillator layer.

7. The neutron detection device of claim 1 wherein the second neutron sensitive layer is vacuum deposited on the second side surface of the scintillator layer.

8. The neutron detection device of claim 1 wherein a tapered optical fiber is disposed between the scintillator layer and the light sensitive device.

9. The neutron detection device of claim 8 wherein the tapered optical fiber has an input surface and an output surface; wherein the second neutron sensitive layer is disposed on the input surface; wherein the scintillator layer is disposed on the second neutron sensitive layer; and wherein the input surface is curved and has a concave shape.

10. The neutron detection device of claim 1 the neutron sensitive layer is a layer of neutron sensitive material in powder form; and wherein the scintillator layer extends from a first side surface to a second side surface; the layer of neutron sensitive material being deposited on the first side surface.

11. The neutron detection device of claim 10 wherein said neutron sensitive material in powder form comprises one of lithium, boron, gadolinium, cadmium, indium, dysprosium.

12. The neutron detection device of claim 11 wherein the second neutron sensitive layer comprises at least one of GdF3, Gd2O3 or LiF.

13. The neutron detection device of claim 11 further comprising:
   a second scintillator layer located in close proximity to the second neutron sensitive layer; wherein the second scintillator layer extends from a third side surface to a fourth side surface; the third side surface located in close proximity to the second neutron sensitive layer; and
   a third neutron sensitive layer disposed in close proximity to the fourth side surface of the second scintillator layer;
   wherein the second scintillator layer and the third neutron sensitive layer at disposed between the second neutron sensitive layer and the light sensitive device.

14. The neutron detection device of claim 13 wherein the second scintillator layer is vacuum deposited on the second neutron sensitive layer; and where in the third neutron sensitive layer is vacuum deposited on the second scintillator layer.

15. The neutron detection device of claim 10 wherein the scintillator layer is vacuum deposited on a substantially optically transparent substrate.

16. The neutron detection device of claim 15 further comprising a second neutron sensitive layer in close proximity to the second side surface of the scintillator layer; the second neutron sensitive layer being deposited on a surface of the substantially optically transparent substrate on which the scintillator layer will be subsequently deposited.

17. The neutron detection device of claim 10 further comprising a protective coating deposited on the layer of neutron sensitive material.

18. A neutron detection device for neutron radiography comprising:
   a neutron sensitive layer that absorbs the neutrons and converts energy from the neutron into another form of energy such as electrons, betas or gammas; wherein the neutron sensitive layer is one of foil of neutron sensitive material or a layer of neutron sensitive material in powder form;
   a microcolumnar scintillator layer located in close proximity to the neutron sensitive layer, the scintillator layer configured to absorb energy emitted from the neutron sensitive layer to convert the energy into optical photons; and a light sensitive device configured to detect the optical photons from the microcolumnar scintillator layer and to form an image;

wherein a tapered optical fiber is disposed between the scintillator layer and the light sensitive device;

wherein the tapered optical fiber has an input surface and an output surface;

wherein the scintillator layer is disposed on the input surface; and wherein the input surface is curved and has a concave shape; and wherein an outer surface of the neutron sensitive layer conforms to the concave shape.

19. The neutron detection device of claim 18, wherein the tapered optical fiber is a hexagonally shaped tapered optical fiber.

20. A method of fabricating a neutron detection device, the method comprising:

placing a first end surface of a microcolumnar scintillator layer in close proximity to a neutron sensitive layer; wherein the neutron sensitive layer absorbs the neutrons and converts energy from the neutron into another form of energy such as electrons, betas or gammas and the microcolumnar scintillator layer absorbs energy emitted from the layer of neutron sensitive material to convert the energy into optical photons; wherein the neutron sensitive layer is one of foil of neutron sensitive material or a layer of neutron sensitive material in powder form;

and operatively optically connecting a light sensitive device to a second end surface of the microcolumnar scintillator layer in order to detect the optical photons from the scintillator;

wherein the microcolumnar scintillator layer is vacuum deposited on the neutron sensitive layer; and depositing a second neutron sensitive layer on the second surface of the microcolumnar scintillator layer.

21. The method of claim 20 wherein the neutron sensitive layer is a foil of neutron sensitive material.

22. The method of claim 20 wherein the microcolumnar scintillator layer is vacuum deposited on a substantially optically transparent substrate; the neutron sensitive layer being in close proximity to a first end surface of the microcolumnar scintillator layer; a second end surface of the microcolumnar scintillator layer being disposed on the substantially optically transparent substrate.

23. The method of claim 22, further comprising:

forming the neutron sensitive layer by depositing a neutron sensitive material in powder form on the first end surface of the microcolumnar scintillator layer.

24. The method of claim 22 wherein the optically transparent substrate is a tapered optical fiber.

25. The method of claim 24 further comprising vacuum depositing a second neutron sensitive layer on a surface of the tapered optical fiber on which the microcolumnar scintillator layer will be deposited, deposition of the second neutron sensitive layer occurring before deposition of the microcolumnar scintillator layer.

26. The method of claim 20 further comprising: pixelating the microcolumnar scintillator layer before operatively optically connecting the light sensitive device to the second end surface of the microcolumnar scintillator layer.

27. A method of fabricating a neutron detection device and reducing parallax errors, the method comprising:

placing a first end surface of a microcolumnar scintillator layer in close proximity to a neutron sensitive layer; wherein the neutron sensitive layer absorbs the neutrons and converts energy from the neutron into another form of energy such as electrons, betas or gammas and the microcolumnar scintillator layer absorbs energy emitted from the layer of neutron sensitive material to convert the energy into optical photons; wherein the neutron sensitive layer is one of foil of neutron sensitive material or a layer of neutron sensitive material in powder form;

and, operatively optically connecting a light sensitive device to a second end surface of the microcolumnar scintillator layer in order to detect the optical photons from the scintillator;

wherein the light sensitive device is operatively optically connected to the second end surface of the microcolumnar scintillator layer by a tapered optical fiber; wherein the tapered optical fiber has an input surface and an output surface; wherein the scintillator layer is disposed on the input surface; and wherein the input surface is curved and has a concave shape; and, wherein an outer surface of the neutron sensitive layer conforms to the concave shape.

28. The method of claim 27 wherein the microcolumnar scintillator layer is vacuum deposited on the input surface of the tapered optical fiber; the neutron sensitive layer being in close proximity to a first end surface of the microcolumnar scintillator layer; a second end surface of the microcolumnar scintillator layer being disposed on the tapered optical fiber.

29. The method of claim 28 further comprising vacuum depositing a second neutron sensitive layer on a surface of the tapered optical fiber on which the microcolumnar scintillator layer will be deposited, deposition of the second neutron sensitive layer occurring before deposition of the microcolumnar scintillator layer.

30. The method of claim 27, further comprising:

forming the neutron sensitive layer by depositing a neutron sensitive material in powder form on the first end surface of the microcolumnar scintillator layer.

31. The method of claim 27, wherein the tapered optical fiber is a hexagonally shaped tapered optical fiber.

* * * * *